(12) United States Patent
Shyu

(10) Patent No.: US 6,816,191 B1
(45) Date of Patent: Nov. 9, 2004

(54) IMAGE PROCESSING METHOD FOR THE ADJUSTMENT OF PHOTOGRAPHIC CONTRAST AND THE RELEVANT APPARATUS

(76) Inventor: Ming-Ching James Shyu, 1646 E. 135th Ave., Thornton, CO (US) 80241-1982

( * ) Notice: Subject to any disclaimer, the term of this patent is extended or adjusted under 35 U.S.C. 154(b) by 919 days.

(21) Appl. No.: 09/650,657

(22) Filed: Aug. 30, 2000

(30) Foreign Application Priority Data

Apr. 13, 2000 (TW) .................................... 89106897 A

(51) Int. Cl.[7] .............................................. H04N 5/76
(52) U.S. Cl. .............................. 348/231.6; 348/333.11; 348/365
(58) Field of Search ................... 348/207.99, 207.1, 348/207.12, 222.1, 229.1, 231.99, 231.3, 231.6, 239, 254, 333.01, 333.02, 333.12, 362, 364, 365, 649, 671, 673, 674, 211.4, 220.1, 333.05, 333.11

(56) References Cited

U.S. PATENT DOCUMENTS

| | | | |
|---|---|---|---|
| 6,624,846 B1 * | 9/2003 | Lassiter ................... | 348/211.4 |
| 6,674,467 B1 * | 1/2004 | Lee .......................... | 348/231.2 |
| 6,717,626 B1 * | 4/2004 | Kondo et al. ................ | 348/756 |
| 2003/0030729 A1 * | 2/2003 | Prentice et al. .......... | 348/220.1 |
| 2004/0036790 A1 * | 2/2004 | Dow et al. ............. | 348/333.05 |

\* cited by examiner

*Primary Examiner*—Tuan Ho
(74) *Attorney, Agent, or Firm*—Bacon & Thomas, PLLC

(57) ABSTRACT

An image processing method for the adjustment of photographic contrast which utilizes a user interface to display digital image data captured by an image processing apparatus, and allows the user to adjust the set value of the image data and then to store this adjusted value in a parameter setting memory. This enables the apparatus to calculate the contrast characteristics parameter according to the adjusted value, store it in a control parameter memory and to drive a signal converter unit to convert and encode the analog signals transmitted from a image sensing device into digital image data according to the contrast characteristics parameter value stored in the control parameter memory. The apparatus then stores the digital image data thus obtained in an output image memory and transmits the digital image data from the output image memory to the display of the user interface, enabling the contrast value of the imaging system being repeatedly adjusted to obtain the desired contrast in the image.

16 Claims, 7 Drawing Sheets

IMAGE PROCESSING METHOD FOR THE ADJUSTMENT OF PHOTOGRAPHIC CONTRAST AND THE RELEVANT APPARATUS

BACKGROUND OF THE INVENTION

The present invention makes possible the manipulation of image contrast control parameters by means of a feedback process during photographing according to the user's preference. It adjusts and controls the contrast of image data being captured in a real-time fashion to obtain any intended contrast. The invention includes the apparatus for the method.

In a conventional image system, a curve of the photosensitive characteristics represents the relation between the luminance (input brightness) of the subject and the relative reflection density in the photo. In silver halide photography, the "film characteristics curve" refers to the relationship between "exposure" and "density" of the film. This curve is also called D-log H curve, i.e. the characteristics curve of a typical black-and-white photosensitive material (see FIG. 1). The ratio of the variation corresponding to the transverse axis (exposure) and the longitudinal axis (density) in the characteristics curve is the slope of the curve, that is the contrast. Generally, the contrast of a photosensitive material is represented by gamma ($\gamma$), and the definition of the value of $\gamma$ is shown as the following equation:

$$\gamma = \frac{\Delta D}{\Delta \text{Log} H}$$

in which $\Delta D$ represents the density difference between two measured points within the linear region of the characteristics curve, and $\Delta \text{Log } H$ represents the log exposure difference between the two measured points.

Since the contrast characteristics of photosensitive materials generally used in the conventional imaging system, such as negative film, are predetermined by a specific development time, the photographer cannot adjust the contrast during photographing. To accommodate the lighting conditions at the scene, the contrast of the negative film is adjusted by changing its development time. The world famous Zone System is developed for this purpose. Further, U.S. Pat. No. 5,445,929 discloses a chemical-based variable contrast photographing system, which lets the user adjust the contrast effect of a film. However, this method shows the effect only after the film has been chemically processed; it is unable to show the contrast effect at the site or to allow the user to change the contrast during photographing.

As can be seen, the contrast characteristics of regular film are predetermined, and the dynamic range of the recordable scene light is therefore fixed. When capturing the image of a scene, the photographer can only adjust the exposure with the diaphragm opening and the shutter to obtain image input signals of a certain range of light for specific exposure latitude. U.S. Pat. No. 5,159,384 discloses a precise and complicated exposure system which improves the quality of the image input signals. However, it cannot change the values of the characteristics curve of the image system itself.

Conventionally, scene contrast is further directly associated with the subject's luminance range or the relative brightness ratio of the objects under existing lighting condition at the scene. According to past studies, the relative brightness ratio of the most general scene being photographed is within about 20:1 to 800:1, and more particularly 160:1 as a common value. Therefore, this scene contrast is deemed to be a standard contrast for the manufacturer for determining the contrast characteristics of regular negative film. Thus the dynamic range of the recordable scene light of negative film is about 7¼ diaphragm stops. FIG. 2 is an example of an ideal negative film with a dynamic range of scene light at 100:1, the X-axis of its characteristics curve representing the log H (domain of input signal) of the relative brightness ratio between different objects in the scene, and the Y-axis of the characteristics curve representing the density value (value of output signal) developed from the film. If the reference exposure value of a camera is designated to the center of the desired range of the input signals, the characteristics curve of the film will shift horizontally along X-axis while the reference exposure value is being adjusted (essentially, changing the exposure setting on a camera). However, the slope of the curve remains unchanged.

Therefore, as shown in FIG. 2, if the reference exposure value is set in the middle of curve A, the objects within the brightness range of $E_0$–$E_2$ will be recorded on the film as density within 0–2, and the objects of any brightness range above $E_2$ will be overexposed and not distinguishable. When the reference exposure value of the camera is set in the middle of curve B, the objects within the brightness range of $E_1$–$E_3$ will be recorded on the film as density within 0–2, and the objects of any brightness range below $E_1$ or above $E_3$ will be underexposed or overexposed, respectively. Similarly, when the reference exposure value of the camera is set in the middle of curve C, the film can only record objects of a brightness range within $E_2$–$E_4$. Consequently, the slope of the contrast curve of the film remains unchanged when the user changes the reference exposure value (exposure setting) of the camera, and the film can only record an object within a specific dynamic range of the input signals. In addition, when the input dynamic range is being changed without affecting its output signal value (the density range of the film after development), the function representing the contrast characteristics of the photographing system must be changed as well. For example, when the slope of curve B in FIG. 3 is increased, the dynamic range of input signals will hence be reduced toward curve A. If the slope of curve B is reduced, the dynamic range of input signals will be increased toward curve C. However, the range of output signals and the reference exposure value of the camera remain unchanged for all these curves.

Therefore in silver halide photography the characteristic curves of the film defines the dynamic range of input signals, i.e. the recordable range of scene brightness. When the user wants to adjust the recordable dynamic range of a scene, it is necessary to change the characteristics curve of the photographic system. Referring to curve A in FIG. 4, if $X_1$, $X_2$, $Y_1$, $Y_2$ are known, the slope of curve A shows a linear characteristic represented by the function Y=mX+c, in which m is the slope, c is the constant. If the value $X_3$ is added, the curve can be shaped up with $X_3'$ to become curve B as a non-linear characteristic function as shown in FIG. 4. In practice therefore, if $X_N$ is the brightness value of a certain object in the scene selected by the photographer, and $Y_N$ is the value of the output signals defined by the photographer, the slope m of the characteristics curve can be calculated through the following equation in accordance with at least two sets of selected values ($X_N$, $Y_N$):

$$m = \frac{Y_2 - Y_1}{X_2 - X_1}$$

By means of adjusting the value m, the photographer can adjust the contrast value of the system upward or downward. In some cases it is not necessary to use up the full range of its output value in order to set the value $Y_1$–$Y_2$ needed for the user's preference. Although U.S. Pat. No. 5,539,459 has disclosed a similar concept, it neither provides the functionality for a user to control and adjust systems contrast value, nor describes how the system controls and adjusts its contrast value subject to the user's instructions.

As shown in FIG. 5, in the prior digital camera 1, a CCD (charges couple device) 11 is used to capture the scene image through a lens 10 and to convert the image being captured into analog signals. These analog signals are then converted into digital image signals through an analog-to-digital converter 12 and then encoded by an encoder 13, stored in a memory (or storage device) 14 and output through a display 15. Thus the control parameters 16 were set statically with predetermined criteria by controlling its gain and offset to adjust the system characteristics of a linear function similar to Y=mX+c, as disclosed in U.S. Pat. No. 4,187,519. The static principle underlying the patent does not include any concept of building up a non-linear function relationship, and does not allow the value of the input signal for use in the contrast-adjusting process to be set by the user. Since visual contrast in human visual systems varies with the intensity of the scene light, a direct mapping from the dynamic range of input scene light to the whole range of output signals will not satisfy the photographer's needs for controlling and adjusting the characteristics of image contrast in real-time according to his preference.

SUMMARY OF THE INVENTION

The present invention provides an image processing method by way of manipulating the image contrast control parameters through a feedback process, and it defines the related apparatus. It calculates a new contrast control parameter subject to the projection of the scene light measured and the control parameter input by the user, and it stores this new parameter in a control parameter memory. The parameter can now be used to adjust the contrast of the image data being duly captured, and to display the image data being adjusted through a display (for example, LCD) of the user interface, enabling the user to freely adjust the contrast control parameters through a feedback process subject to his preference. Thus the apparatus is capable of calculating a linear or non-linear contrast characteristics curve subject to human visual characteristics (for example, Steven's effect), and for using it as a sampling reference value. Using the apparatus, for example, as a digital camera or a digital video camera, to capture the image of a scene, it is now possible to obtain the exact contrast value desired.

DETAILED DESCRIPTION OF THE PREFERRED EMBODIMENT

Figure 6:
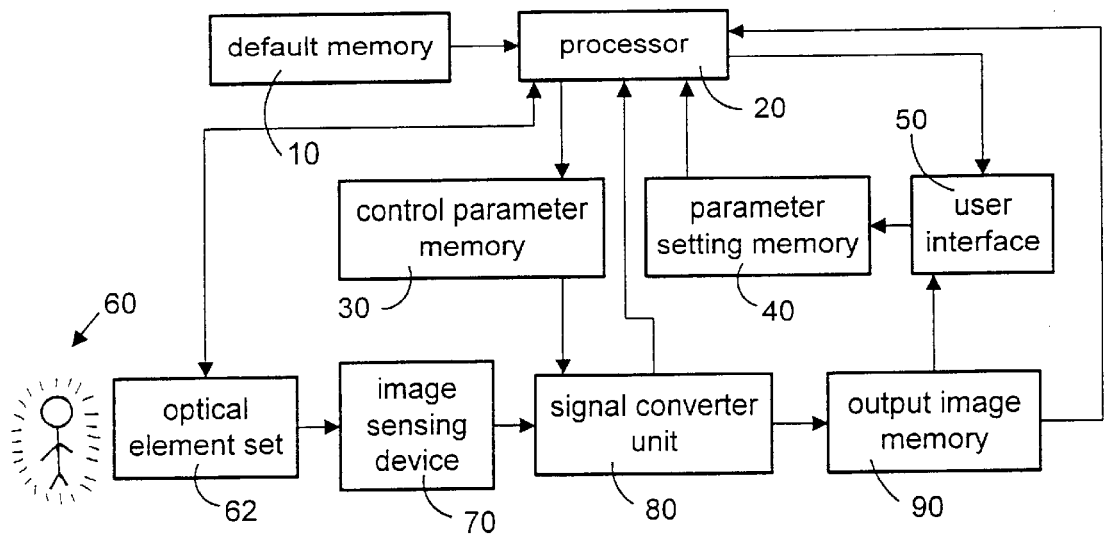
FIG. 6 is a system block diagram of the apparatus for the present invention.

The apparatus for processing photographic contrast which forms part of the present invention (FIG. 6) comprises an optical element set 62 for adjusting diaphragm opening, shutter, focus or exposure value, and for projecting the scene light 60 on to image sensing device (charges couple device) 70 for converting into analog signals representing the color images of the scene, a signal converter unit 80 for converting analog signals into digital image data, an output image memory 90 for storing the digital image data obtained from the signal converter unit 80, a user interface 50 for displaying the digital image data stored in the output image memory 90 and for enabling the user to manipulate the contrast control parameters which will consequently change the values of the digital image data, a parameter setting memory 40 for storing parameters set by the user through the user interface 50, a default memory 10 for storing default values, a control parameter memory 30 for storing control parameters enabling the digital image data to be adjusted and processed by the signal converter unit 80, and a processor 20 for calculating the control parameters for controlling the image capture function according to the signals from the default memory 10, the optical element set 62, the output image memory 90, the parameter setting memory 40 and the signal converter unit 80, and for storing the control parameters thus obtained in the control parameter memory 30 enabling the signal converter unit 80 to adjust the image data captured by the image sensing device 70.

Figure 7:
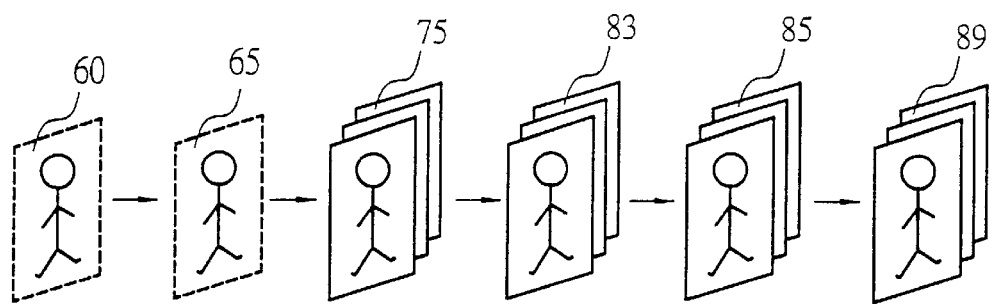
FIG. 7 shows the image data flow when using the apparatus of the present invention.

When the apparatus is in operation as shown in FIG. 7, it will take the following steps.

(1) It captures the image of the scene 60 through the optical element set 62 (which may include lens, diaphragm opening, shutter and reflecting prism), whose data represent the projection of the scene light 65 that is, the amount of light relative to the scene. If the projected scene light 65 is being measured by an exposure meter, it is read as the so-called exposure value.

(2) Upon the arrival of the projected scene light 65 at the apparatus, the image sensing device 70 immediately converts it 65 into multi-channel analog voltage and current signals 75 representing the color image of the scene 60.

(3) The analog signals 75 are then converted by an A/D converter 82 of the signal converter unit 80 into L-bit (for example, 12-bit) digital image data 83.

Figure 8:
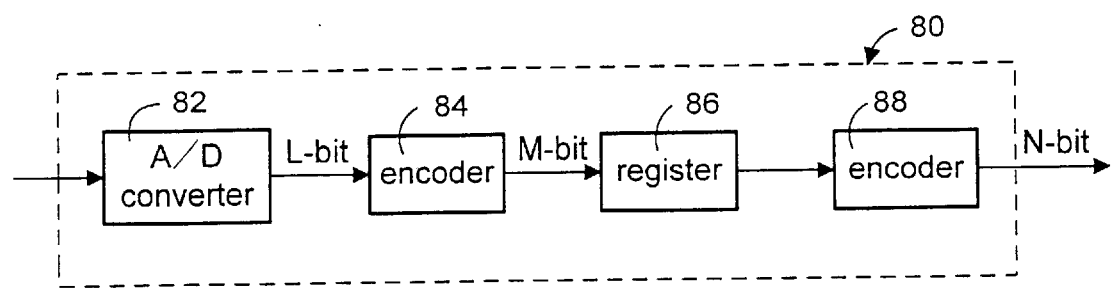
FIG. 8 is a block diagram of the signal converter unit of the present invention.

(4) The L-bit image data 83 are converted by an L-bit-M-bit (hereinafter. L-M) encoder 84 of the signal converter unit 80 to produce M-bit (for example 10-bit) digital image data 85 according to the generated settings in its converting table, and the M-bit digital image data 85 are stored in a register 86 of the signal converter unit 80. (See FIG. 8.)

The M-bit digital image data 85 are then sent to an M-bit-N-bit (hereinafter, M-N) encoder 88 of the signal converter unit 80, causing the M-N encoder 88 to produce N-bit (for example 8-bit) digital image data 85 (See also FIG. 8) and to store the N-bit digital image data 89 in the output image memory 90.

Figure 9:
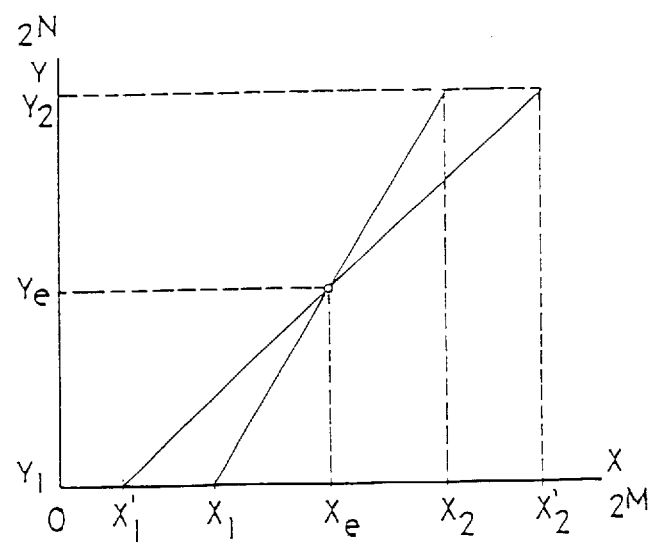
FIG. 9 shows the attributes of the contrast function of the characteristics curve, its domains of input signal X, its values of output signal Y and exposure reference value $X_e$ according to the present invention.

With the present invention, the value of M is set at not less than the value of N, that is, $M \geq N$. According to the conversion of the M-N encoder 88, the number of values of the digital image data can be reduced from $2^M$ to $2^N$. Therefore, within the input signal dynamic domain X, shown in FIG. 9, only $2^M$ of values captured are correspondingly converted into $2^N$ of values within the output signal range Y, and the linear relationship between sampled values can be represented by the function Y=mX or $(Y_2-Y_1)=m(X_2-X_1)$, in which $Y_2$ and $Y_1$ are the maximum value and the minimum value, respectively, in the output signal range. $X_2$ and $X_1$ are the upper limit and lower limit, respectively, of the input dynamic range. The value of the slope m is $$m = \frac{Y_2 - Y_1}{X_2 - X_1}$$

The corresponding relationship is the so-called contrast referred to in the human visual system.

Referring to FIG. 9 again, if the exposure reference value $X_e$ of the apparatus were set within $X_2$ and $X_1$, extending the input signal dynamic range to within $X_2'$ and $X_1'$ would flatten the slope while the exposure reference value $X_e$ would remain unchanged. On the other hand, the contrast of the image would be increased if the input range were reduced while the output range would remain unchanged. Based on this concept, the present invention stores at least one pre-set slope value m in the default memory 10, enabling the apparatus to calculate a conversion table from the known exposure reference value $X_e$, or to calculate a non-linear function according to the values $X_2, X_1, X_0$ in the input signal domain and the corresponding values $Y_2, Y_1, Y_0$ in the output signal range, and then to produce a conversion table subject to the function thus obtained. The value m or the settings of the X, Y values can then be realized through the conversion table thus obtained, so as to adjust the contrast of the image of the scene being captured by the apparatus. Because the number of the values in the input signal dynamic range is $2^M$, that is, greater than the number $2^N$ of the values in the output signal range, the quantization effect is reduced.

When the projection of the scene light 65 arrives at the apparatus, the processor 20 adjusts the diaphragm opening or the shutter or the gain and offset values of the A/D converter 82 of the ah signal converter unit 80 in accordance with the exposure value measured by the optical element set 62, so as to set the exposure reference value $X_e$ of the image and to adjust the range of the input signals based on the set exposure reference value $X_e$. Because the tuning of the exposure is separated from the effect of the adjustment of the contrast, the contrast adjustment of the present invention can be independently controlled along with the exposure control of the apparatus.

Figure 4:
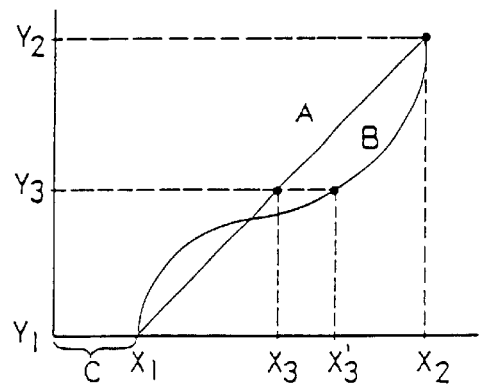
FIG. 4 is a schematic drawing showing the characteristics curves of the linear function Y=mX+c and the non-linear function of the image processing apparatus.
Figure 5:
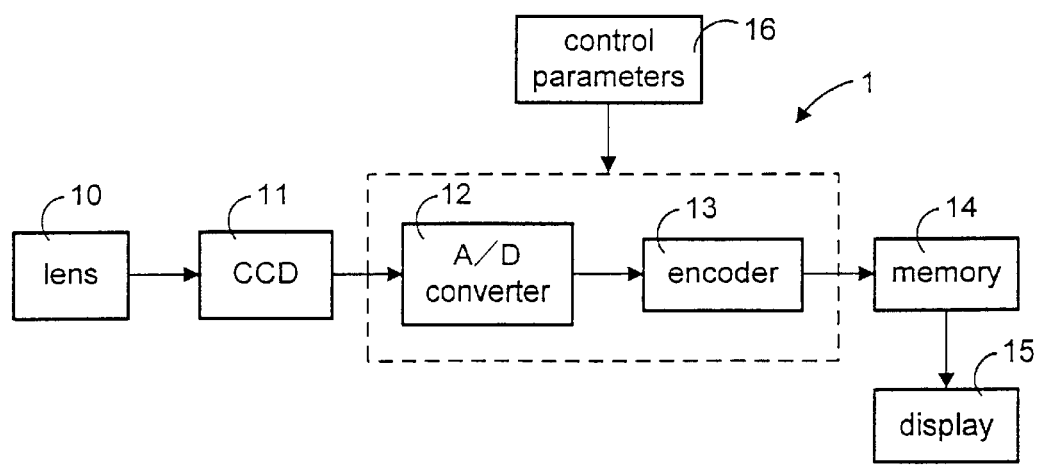
FIG. 5 is a system block diagram of the prior digital camera.
Figure 10:
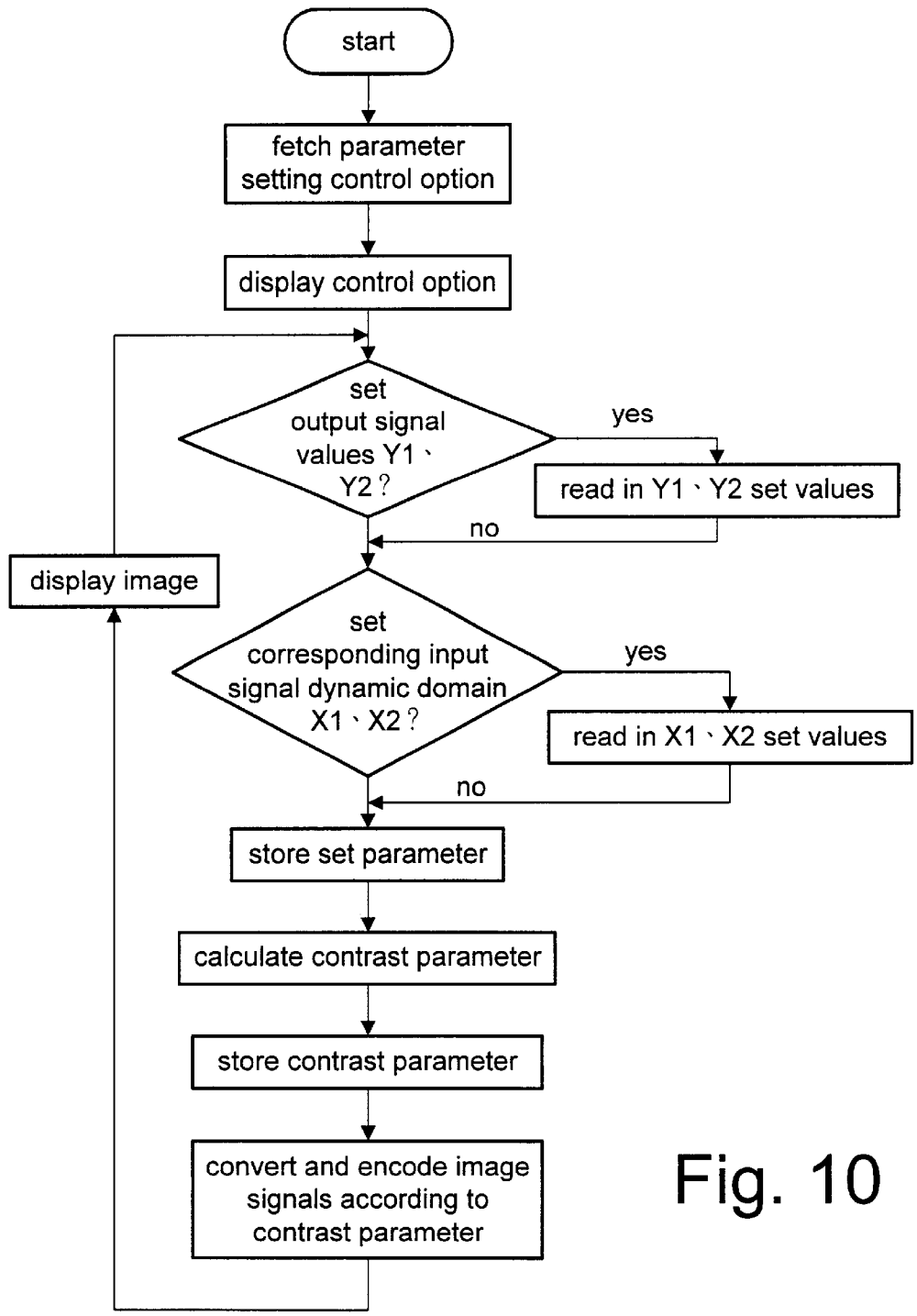
FIG. 10 shows a processing flow according to the first embodiment of the present invention.
Figure 11:
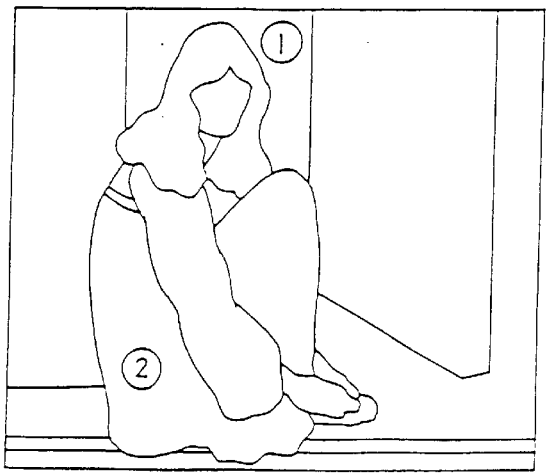
FIG. 11 shows the optical element set aimed at the projection of the scene light of an object in the destination position according to the embodiment shown in FIG. 10.

In one embodiment of the present invention, the processor 20 controls the components of the apparatus to adjust the contrast value of the image data, (see FIG. 10) as following steps:

(1) The processor 20 fetches the pre-set parameter, setting the control values from the default memory 10, and shows the parameter on the display of the user interface 50, enabling the user to set the output signal values $Y_1, Y_2$ ($Y_1, Y_2$ need not be the upper and lower limit values of Y). The processor 20 then acquires the dynamic values of input signals $X_1, X_2$ of the projection of the scene light 65 through the optical element set 62 corresponding to the designated positions of the dynamic values of output signals $Y_1, Y_2$ and stores the set values in the parameter setting memory 40. In this embodiment, the dynamic values of input signals $X_1, X_2$ can be the values measured by the optical element set 62 aimed at the projection of the scene light 65 from the designated positions 1, 2, as shown in FIG. 11, which values generally refer to the readings of the exposure meter. Further, after setting the values $X_1, X_2$ and the corresponding values $Y_1, Y_2$, the user can input another set of values $X_3, Y_3$ to form a non-linear characteristics curve (for example, curve B) as shown in FIG. 4.

(2) The processor 20 calculates the parameter for contrast characteristics according to the value set by the user and stored in the parameter setting memory 40 and stores the calculated parameter value in the control parameter memory 30 to complete the contrast setting for capturing an image.

(3) When capturing the image of the scene, the processor 20 drives the signal conversion unit 80 to convert and encode the analog signals transmitted from the image sensing device 70 according to the contrast characteristics parameters stored in the control parameter memory 30 and then stores the N-bit digital image data 89 thus obtained in the output image memory 90.

(4) Thereafter the processor 20 transmits the image data from the output image memory 90 to the display of the user interface 50, for enabling the user to repeat procedure (1) and to re-set the output signal values $Y_1, Y_2$ and the dynamic values of input signal $X_1, X_2$ through the control option according to the user's preference.

In this embodiment the user can directly operate the optical element set 62 to set input dynamic values $X_1, X_2$ and output signal values $Y_1, Y_2$ corresponding to at least two designated positions in the projection of the scene light 65 and let the processor 20 calculate the contrast parameter of the scene image according to the set values in real-time fashion. Therefore, the non-linear L-bit-to-M-bit digital image data conversion procedure may be concatenated with the linear M-bit-to-N-bit conversion procedure during the converting and encoding process of the signal converter unit 80, and the encoders 84 and 88 can then be combined and the register 86 eliminated.

Figure 1:
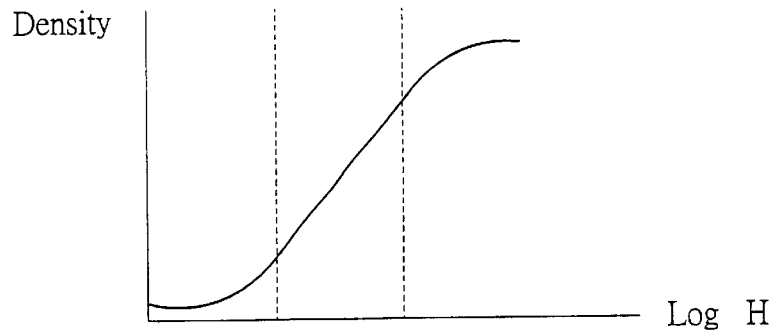
FIG. 1 shows a characteristics curve obtained from a typical black-and-white photosensitive material according to the prior art.
Figure 2:
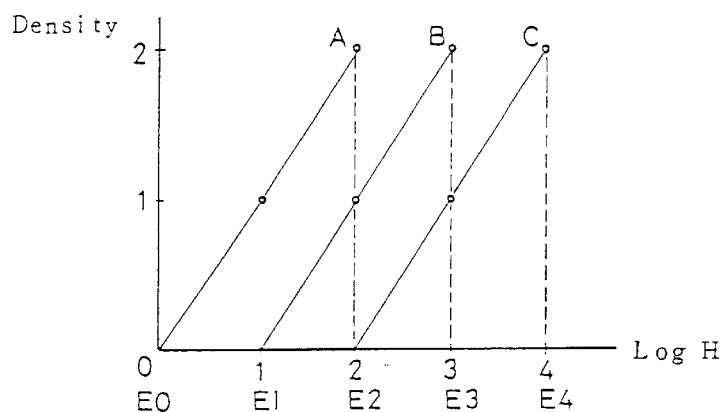
FIG. 2 shows the variation status of the contrast curves of an ideal film in a particular dynamic range of input signals with various exposure reference values from the camera for film with a fixed input dynamic range of 100:1.
Figure 3:
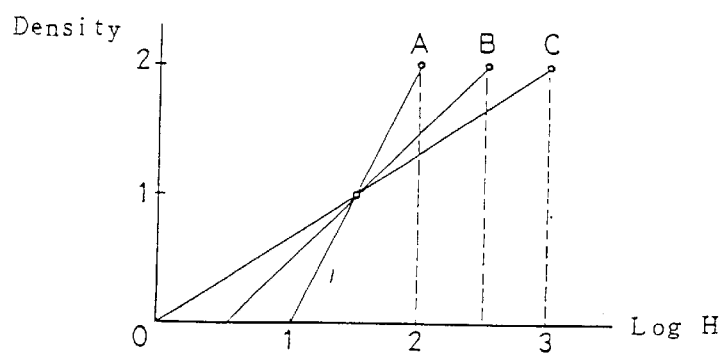
FIG. 3 shows the variation of slopes of the characteristics function of an image processing apparatus with different dynamic ranges of input signals under the condition of a fixed output range of film.
Figure 12:
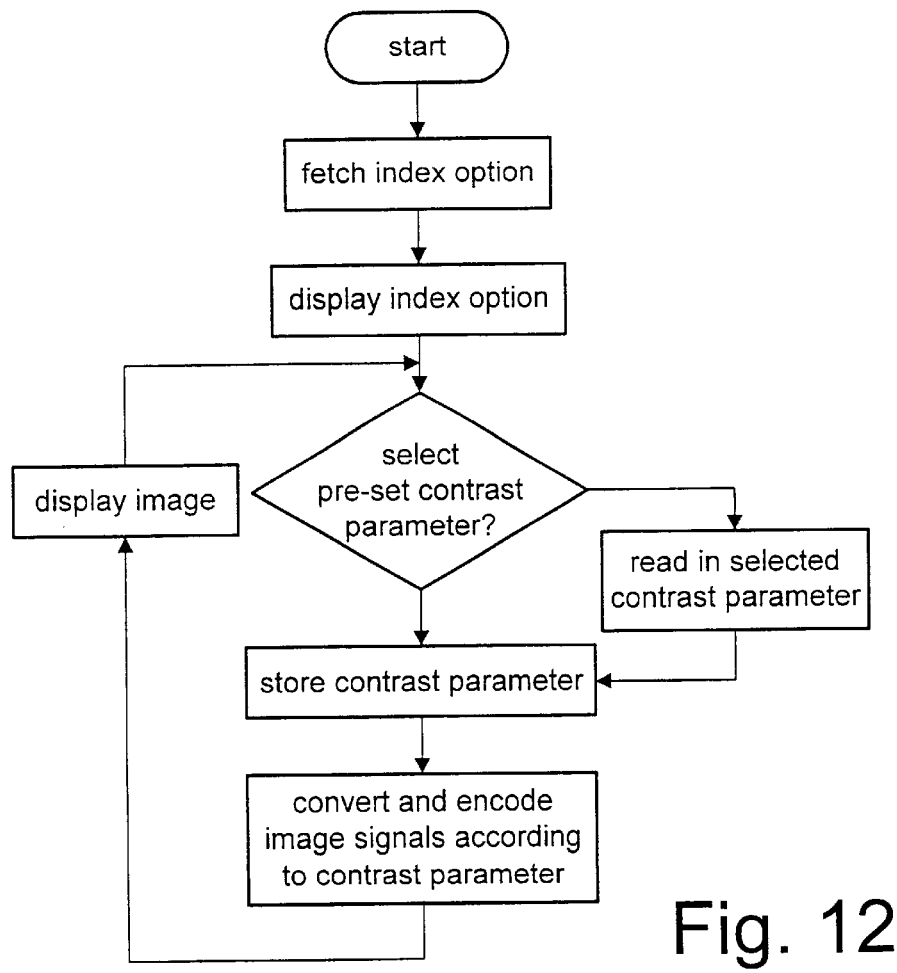
FIG. 12 illustrates a processing flow according to the second embodiment of the present invention.

In another embodiment of the present invention, the processor 20 controls the components of the apparatus to adjust the contrast value of the image data being captured, as shown in FIG. 12, proceeding as follows:

(1) The processor 20 fetches an index option having at least one pre-set contrast parameter value from the default memory 10 and shows the index option through the display of the user interface 50 for selection by the user, enabling the selected value to be stored in the parameter setting memory 40.The selected value may be the slope of the characteristics curve. Thus by means of directly fetching the pre-set values, the slope can be changed to, for example, the characteristics curve A, B or C defined in FIG. 3.

(2) The processor 20 calculates the contrast characteristics parameters (which may have non-linear attribute,) according to the values set by the user and stored in the parameter setting memory 40 along with the exposure reference value measured by the optical element set 62, and then stores the contrast characteristics parameters in the control parameter memory 30 to complete the contrast setting for capturing an image.

(3) When the user is photographing the image of the scene, the processor 20 drives the signal conversion unit 80 to convert and encode the analog signals transmitted from the image sensing device 70 according to the contrast characteristics parameters stored in the control parameter memory 30 and then store the N-bit digital image data 89 thus obtained in the output image memory 90.

(4) The processor 20 transmits the image data from the output image memory 90 to the display of the user interface 50, enabling the user to repeat the procedure (1) and to fetch the pre-set contrast parameter value from the index option according to his preference.

According to this second embodiment the user can select the desired contrast parameter value from the default values stored in the default memory 10 through the user interface 50.Therefore, the non-linear L-bit-to-M-bit digital image data conversion procedure may be concatenated with the linear M-bit-to-N-bit conversion procedure during the converting and encoding process of the signal converter unit 80, and the encoders 84 and 88 can then be combined and the register 86 eliminated.

Figure 13:
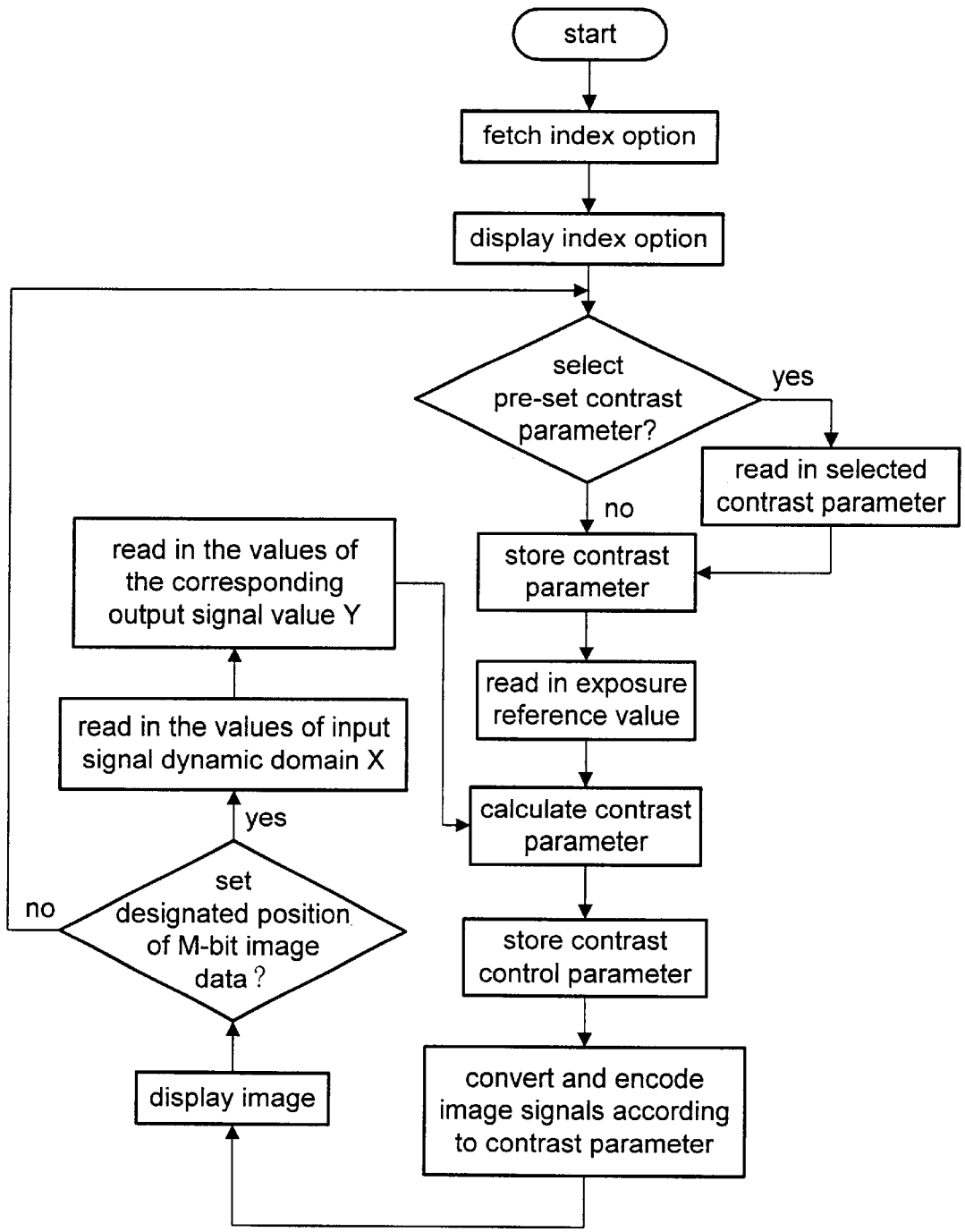
FIG. 13 illustrates a processing flow according to the third embodiment of the present invention.

In still another embodiment of the present invention the processor 20 controls the components of the apparatus to adjust image data contrast value as shown in FIG. 13, according to the following procedure:

(1) The processor 20 fetches an index option having at least one pre-set contrast parameter value from the default memory 10 and shows the index option through the display of the user interface 50, enabling the user to select the desired contrast parameter value by means of an input device on the user interface 50. The processor then stores the selected contrast parameter value in the parameter setting memory 40.

(2) The processor 20 calculates the contrast characteristics parameter according to the values set by the user and stored in the parameter setting memory 40 along with the exposure reference value measured by the optical element set 62, then stores the contrast characteristics parameter in the control parameter memory 30 to complete the contrast setting for capturing an image.

(3) When the user is photographing the image of the scene, the processor 20 drives the signal conversion unit 80 to update the data of the mapping table in the A/D converter 82 according to the exposure reference value measured by the optical element set 62 and the contrast characteristic parameter stored in the control parameter memory 30, so that the analog signals 75 transmitted from the image sensing device 70 can be converted into L-bit digital image data 83. The L-bit digital image data 83 represent the projected intensity of the projection of the scene light on the image sensing device 70 and its linear ratio in digital signals, however it remains in a non-linear relationship to human visual signals.

(4) The processor 20 drives the L-M encoder 84 to update the look-up table so as to convert the L-bit image data 83 into M-bit digital image data 85 which represent the linear signals perceived in the human vision system, then stores the M-bit digital image data 85 in the register 86.

(5) The processor 20 drives the M-N encoder 86 to update the data of its look-up table according to the contrast characteristics parameter stored in the control parameter memory 30 so as to convert the M-bit image data 85 into corresponding N-bit digital image data 89, then stores the N-bit digital image data 89 in the output image memory 90 and shows it on the display of the user interface 50, enabling the user to repeat the procedure (1) and to select the desired contrast parameter value from the index option according to his preference.

In this conversion process the value of the M-bit represents the domain of input signal X shown in FIG. 4 and the value of the N-bit represents the output signal Y. The parameters defined in the conversion table are the corresponding function or characteristics curve determined by the range of input signals, and the position of the middle reference point will be determined according to the exposure reference value.

(6) If the user wishes to adjust the contrast of the scene image captured by the apparatus, he can use a positioning means on the user interface 50 to select the designated positions 1, 2 of the image data from the display according to his preference. At this time the processor 20 reads out the M-bit values of the image data from the register 86 corresponding to the designated positions 1, 2, and then stores the designated values in the parameter setting memory 40.The M-bit values are then used as the input signal X shown in FIG. 4, and the desired N-bit values are read out from the user interface 50 and stored in the parameter setting memory 40 to be used as the output signal Y shown in FIG. 4.

(7) The processor 20 fetches the values stored in the parameter setting memory 40, for example, the value $X_N$ and the value $Y_N$ shown in FIG. 4, and calculates a new characteristics curve, stores it in the control parameter memory 30 and repeats the procedure (4) to modify the conversion table according to the new characteristics curve through the encoders, encoding and converting the digital scene image data being captured for adjusting its contrast effect.

By means of the image processing apparatus of the present invention the user can freely adjust the contrast control parameters by means of a feedback method subject to his preference, enabling the apparatus to generate a linear or non-linear contrast characteristics curve based on human vision for use as a sampling reference value when using the apparatus (for example, a digital camera or a digital video camera) to photographing the image of a scene, while obtaining the optimal contrast value desired.

It is to be understood that the drawings are designed for purposes of illustration only and not intended as a definition of the scope of the invention disclosed.

What the invention claimed is:

1. A apparatus for the purpose of an image processing method for the adjustment of photographic contrast comprising:

an optical element set for adjusting diaphragm opening, shutter, focus, and exposure value, and for projecting the scene light onto an image sensing device;

an image sensing device for receiving the projection of the scene light through the said optical element set and for converting it into analog signals representing the color image of the scene;

a signal converter unit for converting analog signals into digital image data;

an output image memory for storing the digital image data obtained from the said signal converter unit;

a user interface for displaying the digital image data stored in the said output image memory and for enabling the user to manipulate contrast control parameters which will consequently change the values of the digital image data;

a parameter setting memory for storing parameters set by the user through the said user interface;

a default memory for storing default values;

a control parameter memory for storing control parameters enabling digital image data to be encoded and adjusted by the said signal converter unit;

a processor for calculating control parameters for controlling the image capture function according to the signals from the said default memory, the said optical element set, the said output image memory, the said parameter setting memory and the said signal converter unit, and for storing the control parameters thus obtained in the said control parameter memory, enabling the said signal converter unit to adjust the image data captured by the said image sensing device.

2. The apparatus of claim 1 wherein the said signal converter unit comprises an analog/digital converter for converting the analog signals transmitted from the said image sensing device into digital image data.

3. The apparatus of claim 2 wherein the said signal converter unit further comprises:

an L-bit-M-bit encoder for converting the digital image data transmitted from the said analog/digital converter into M-bit digital image data according to a converting table set therein; and an M-bit-N-bit encoder for converting the M-bit digital image data according to a converting table set therein, the value of M being set at not less than the value of N so that $2^M$ of values sampled from the dynamic domain of input signal X, according to the conversion of the M-N encoder, are correspondingly converted into $2^N$ of values of the output signal Y, so as to in the function between processed values as $$m = \frac{Y_2 - Y_1}{X_2 - X_1}$$

in which $Y_2$ and $Y_1$ are the maximum value and the minimum value respectively of the output signal range, $X_2$ and $X_1$ are the upper limit and lower limit respectively of the input dynamic range, and M is the slope, representing the so-called contrast in the human visual systems.

4. The apparatus of claim 3 wherein the said signal converter unit further comprises a register for storing the M-bit digital image data obtained from the said L-bit-M-bit encoder.

5. The apparatus of claim 3 wherein the said signal converter unit further comprises a register for storing the N-bit digital image data obtained from the said M-bit-N-bit encoder.

6. An image processing method for the adjustment of photographic contrast used in an image processing apparatus by way of controlling certain elements thereof and comprising the steps of:

fetching a pre-set parameter setting control option from a default memory and showing this option through the display of a user interface enabling the user to select values for adjusting the image contrast and to store selected values in a parameter setting memory;

calculating the contrast characteristics parameter according to one or more values set and stored in the parameter setting memory and then storing the parameter value in a control parameter memory;

driving a signal converter unit to convert and encode the analog signals from an image sensing device into digital image data according to the contrast characteristics value stored in the control parameter memory after an image of the scene has been captured and then storing the digital image data thus obtained in an output image memory; and transmitting the digital image data from the said output image memory to the display of the user interface thus enabling the user to adjust the contrast value of the image by repeating the aforesaid steps.

7. The method of claim 6 further comprising the step of calculating a linear or non-linear contrast characteristics parameter of the image data according to the value set and stored in the parameter setting memory and the exposure reference value measured by an optical element set and then storing the contrast characteristics parameter of the image data in the control parameter memory.

8. The method of claim 6 were the said control option is a parameter setting control option for setting dynamic values of at least two output signals $Y_1$, $Y_2$ and then operating an optical element set in order to set the dynamic values of input signals $X_1$, $X_2$ of the projection of the scene light in the control option corresponding to the destination positions of the dynamic values of output signals $Y_1$, $Y_2$ and storing the set values in the parameter setting memory.

9. The method of claim 8 wherein the image data stored in the output image memory, after being transmitted to the user interface for display, enable the processing steps to be repeated for re-setting the dynamic values of output signals $Y_1$, $Y_2$ and for resetting the dynamic values of input signal $X_1$, $X_2$ through the control option.

10. The method of claim 8 wherein the dynamic values of input signals $X_{1, 2}$ are the values measured by the optical element set aimed at the projection for the scene light from the destination positions.

11. The method of claim 6 wherein the said control option is an index option including at least one predetermined contrast value for selection through a user interface.

12. The method of claim 6 wherein the image data stored in the output image memory, after having been transmitted to the user interface for display, enables the processing steps to be repeated for selecting the desired contrast parameter value from the said index option.

13. The method of claim 6 further comprising the step of:

driving the signal converter unit to update the data of the conversion table in an A/D converter according to the exposure reference value measured by an optical element set and the contrast characteristic parameter stored in a control parameter memory when the image of the scene has been captured so as to convert an analog signal transmitted from an image sensing into L-bit digital image data;

driving an L-bit-M-bit encoder to update the data of an internal conversion table therein according to the contrast characteristics parameter stored in the control parameter memory, so as to convert the L-bit image data into M-bit digital image data and to store the M-bit digital image data in a register, and driving an M-bit-N-bit encoder to update the data of an internal conversion table therein according to the contrast characteristics parameter store din the control parameter memory, so as to convert the M-bit image data into corresponding N-bit digital image data, and to store the N-bit digital image data in an output image memory and show the N-bit digital image data on a display of the user interface, enabling the processing steps to be repeated for selecting the desired contrast parameter value from the control option.

14. The method of claim 13 wherein the value of the said M-bit represents the dynamic range of input signal X and the value of the said N-bit represents the dynamic range of output signal Y and the parameters defined in the conversion table are the characteristics curve for adjusting the contrast.

15. The method of claim 14 wherein the position of the middle reference point defined in the conversion table is determined according to the exposure reference value.

16. The method of claim 13 which enables the contrast of the scene image captured to be adjusted by using positioning means on the user interface to select the designated positions of the image data from the display according to the steps of:

reading the values of the image data from the register corresponding to the designated positions and then storing the values in the parameter setting memory, in which the M-bit values are being used as the references of the input signal, and the desired N-bit values are being read out from the user interface and then stored in the parameter setting memory to be used as the references of the output signal; and fetching the values stored in the parameter setting memory and calculating a new characteristics curve, then storing the new characteristics curve in the control parameter memory and repeating the processing steps to modify the conversion table according to the new characteristics curve, so as to encode and convert the fetched digital scene image data for adjusting the contrast effect.

\* \* \* \* \*